UNITED STATES PATENT OFFICE.

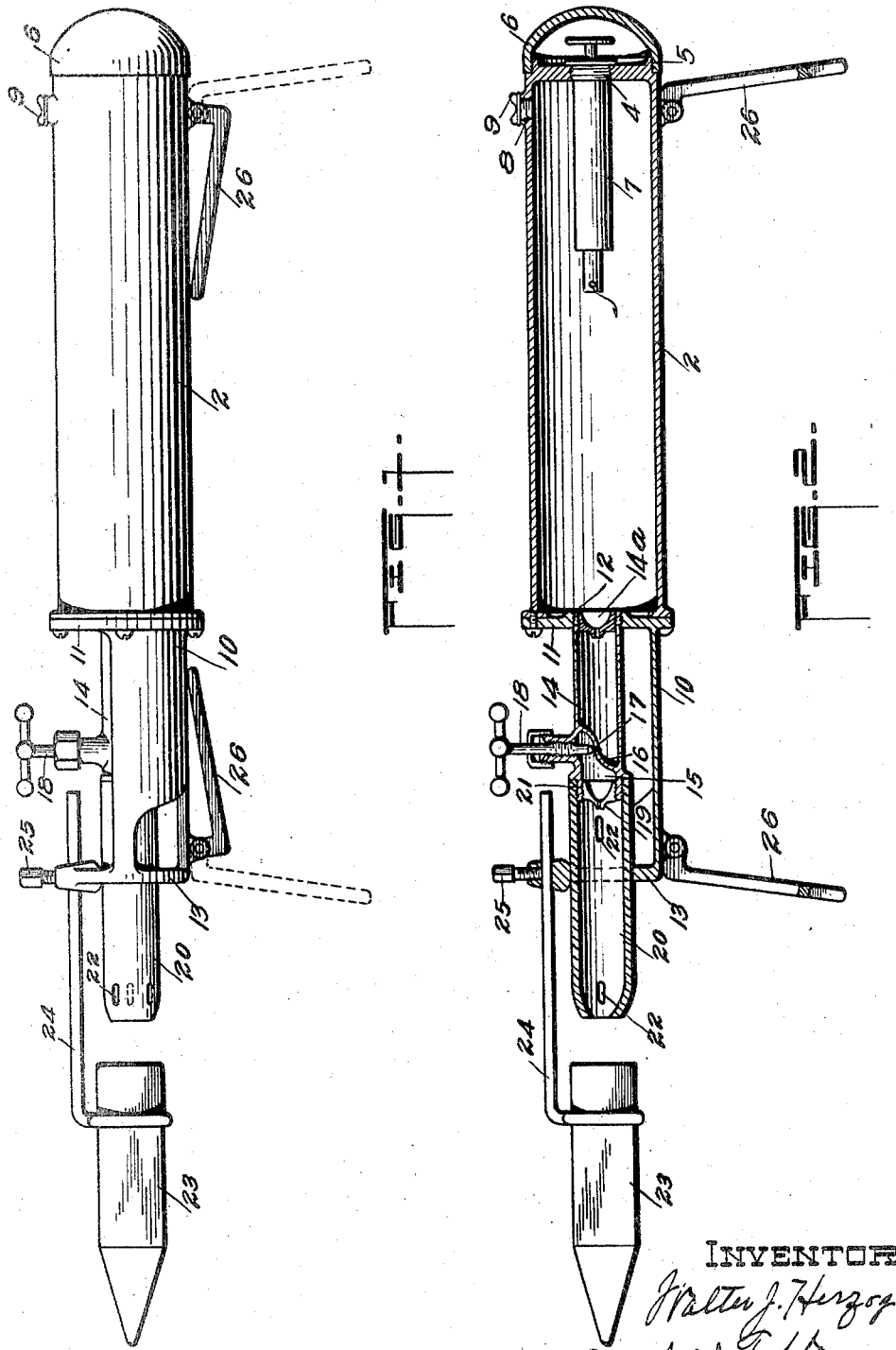

WALTER J. HERZOG, OF PEKIN, ILLINOIS.

COMBINED BLOW-TORCH AND SOLDERING-IRON.

1,249,625.   Specification of Letters Patent.   Patented Dec. 11, 1917.

Application filed July 26, 1916. Serial No. 111,483.

*To all whom it may concern:*

Be it known that I, WALTER J. HERZOG, a citizen of the United States, residing at Pekin, in the county of Tazewell and State of Illinois, have invented certain new and useful Improvements in Combined Blow-Torches and Soldering-Irons, of which the following is a specification.

My invention relates to a combined blow torch and soldering iron.

More particularly my invention relates to the arrangement of parts and devices to contain gasolene, to compress the same, to cause it to feed into a vaporizing chamber, valve control for discharge of gas, a mixing chamber and a soldering iron.

My invention comprehends the combination of parts as above noted to produce a blow torch and the association of a soldering iron; to details of construction and combination of parts hereinafter more particularly pointed out in the specifications and claims.

Referring to the drawings:

Figure 1 is a side view of my complete device.

Fig. 2 is a longitudinal sectional view of the same subject matter shown in Fig. 1.

My invention contemplates the production of a heater for soldering irons, will heat the iron while it is being used, the same being a composite instrument, embracing the soldering tool, gasolene container, vaporizer, mixing chamber, controls, jets, all in a unit structure that can be held readily in the hand of the user.

Having special reference to details of structure, 2 is a reservoir or container, in size of about grasp of the hand, said reservoir being closed with the head member having threaded opening 4, for the insertion and support of an air pump and threaded at 5 to receive a threaded cap 6. 7 is an air pump which may be of any approved type. 8 is a supply opening into the reservoir and 9 is a closure for the same.

10 is a troughlike cast member having a head member 11, attached as shown to the open end of reservoir 2 for closure purposes and is provided with a threaded opening 12, and is also formed at its other extremity with a bracket member 13 for supporting purposes.

14 is a vaporizer tube or chamber communicating with and supported within discharge opening 12 from the reservoir, through inlet member 14ª. 15 is a valve chamber walled from the main body of the vaporizer chamber by partition 16, having the perforation or valve seat 17 therethrough. 18 is a valve stem which may be of any approved type, the point thereof designed for seating to control the opening 17 in partition 16. 19 is a jet member secured in the discharge end of tube 14.

20 is a mixing chamber or tube having the close joint threaded connection 21 with tube 14, shown, said chamber having a contracted exit end and being slotted as at 22 in series and at spaced intervals longitudinally and circumferentially. Tubular chamber 20 is supported in bracket member 13. 23 is a soldering iron and 24 is a holder therefor serving to embrace the same and having a member extending rearwardly for support and attachment in connection with bracket member 13 by means of a set screw 25 which coöperates with a suitable perforation in said bracket to effect such support of the soldering iron holder to facilitate adjustment of the latter to position, the soldering iron in line with the discharge opening from mixing chamber 20 and at varying distances therefrom as desired in practical use.

26 are foldable leg members, pivoted to the tool structure as shown, to provide means for seating the tool on the floor or other support, said leg members being spaced apart at their bottom portion as inferentially shown in Fig. 2.

What I claim is:

1. In a device of the class described, in combination, a tubular handle forming a gasolene reservoir having an integral closure at one end through which projects an air pump, and open at its opposite end, a head member removably secured to the open end of the tubular handle and provided with an opening, a vaporizing tube secured at one end in said opening, a removable plug formed with a small outlet opening threaded in each end of the vaporizing tube, a transverse partition near the outer end of the latter tube having a perforation therein, a manually operable valve for regulating the passage of gas through said perforation, a semi-circular trough shaped bracket integral with the head member projecting outwardly therefrom and below the vaporizing tube, a mixing tube threaded on the vaporizing tube and projecting through an opening in the end of the bracket, an adjustable arm carried in said bracket end, and a soldering iron supported in line with the mixing tube by said arm.

2. In a device of the class described, in combination, a tubular handle forming a gasolene reservoir having an integral closure at one end through which projects an air pump, and open at its opposite end, a head member removably secured to the open end of the tubular handle and provided with an opening, a vaporizing tube secured at one end in said opening, a removable plug formed with a small outlet opening threaded in each end of the vaporizing tube, a transverse partition near the outer end of the latter tube having a perforation therein, a manually operable valve for regulating the passage of gas through said perforation, a semi-circular trough shaped bracket integral with the head member projecting outwardly therefrom below the vaporizing tube and terminating in two parallel arms connected by a transverse end having an opening therein, a mixing tube supported in said opening and threaded on the outer end of the vaporizing tube, a bearing on the upper part of said end, an adjustable arm slidable longitudinally in said bearing, a bolt in said bearing for fixing the arm in adjusted position, and a soldering iron supported in a depending end of said arm in line with the mixing tube.

3. In a device of the class described, a reservoir, an outlet tube communicating with the reservoir, a bracket member extending from the reservoir for supporting the free end of the outlet tube, a foot member secured to the bracket member and a second foot member secured to the reservoir.

In testimony whereof I affix my signature in presence of two witnesses.

WALTER J. HERZOG.

Witnesses:
MARTIN B. LOHMANN,
L. C. WOOD.

Copies of this patent may be obtained for five cents each, by addressing the "Commissioner of Patents, Washington, D. C."